Patented Feb. 22, 1949

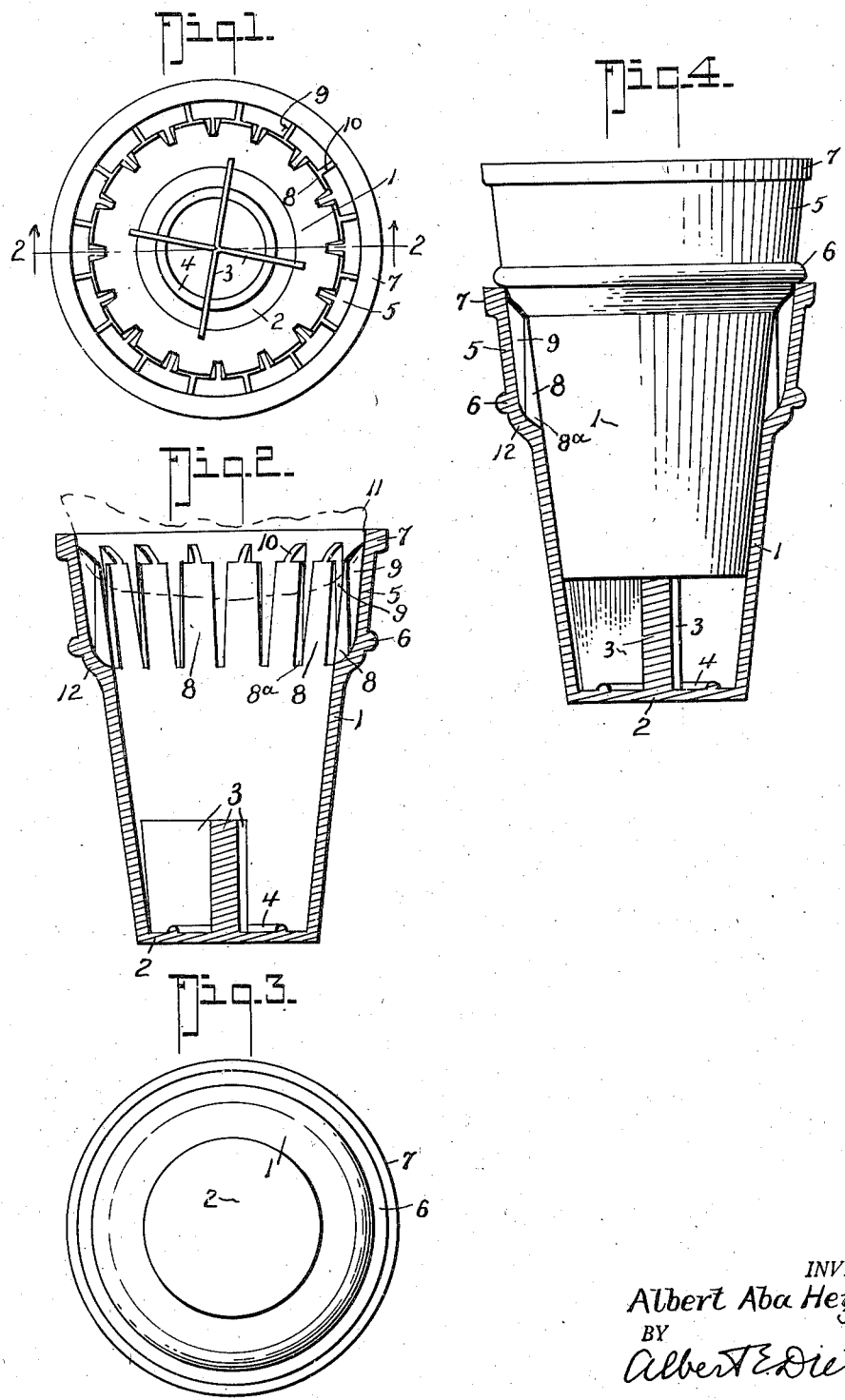
Feb. 22, 1949. A. A. HEYMAN 2,462,497
ICE CREAM CUP
Filed Jan. 29, 1948
INVENTOR,
Albert Aba Heyman,
BY
Albert E. Dieterich,
ATTORNEY.

2,462,497

UNITED STATES PATENT OFFICE 2,462,497

ICE-CREAM CUP

Albert A. Heyman, Baltimore, Md., assignor to Maryland Baking Company, Inc., Baltimore, Md., a corporation of Maryland Application January 29, 1948, Serial No. 5,021

2 Claims. (Cl. 99—89)

My invention which relates to the art of cup pastry has for its object to provide an ice cream cup with means by which a gob of ice cream placed in the cup will be temporarily held from seating deeply in the cup and yet the ice cream will be so engaged by the said means as not to fall off or out of the cup accidentally.

Another object is to provide a pastry cup which will adequately support a gob of ice cream high on the cup without the gob falling off so that substantially all the ice cream can be eaten before it becomes necessary to bite into the cup to obtain the residue of ice cream.

Another object is to hold a serving of ice cream in such manner as to give the appearance of an overfilled cup.

Again it is an object to provide a cup with ice cream retainers of such structure that a nesting ring will not rest on the retainers but only on the mouth ring of the cup (and on the bottom cross ribs of the cup when such cross ribs are used), so that the retainers will not cut or break the nesting rings of nested cups.

Other objects will in part be obvious and in part be pointed out hereinafter.

To the attainment of the aforesaid objects and ends invention still further resides in the novel details of construction, combination and arrangement of parts, all of which will be first fully described in the following detailed description, and then be particularly pointed out in the appended claims, reference being had to the accompanying drawing, in which:

Fig. 1 is a top plan view of a cup embodying my invention.

Fig. 2 is a section on the line 2—2 of Fig. 1.

Fig. 3 is a bottom plan view of the same.

Fig. 4 is a view showing two cups nested, one being shown in section.

In the drawing in which like numerals of reference indicate like parts in all the figures, 1 represents the tapered body of the cone which has an enlarged upper portion 5 terminating in a mouth ring 7 and is provided with a nesting ring 6. The bottom 2 of the cup is flat and is reinforced by means of a ring-like rib 4 and braced by crossed ribs 3 which are of a height sufficient to constitute a seat for a nested cup and hold the nesting ring 6 of that cup in light contact with the mouth ring 7 of the outer cup.

It will be noticed that the nesting ring is located above the place 12 where the offset proper begins. Within the offset or enlarged upper portion of the cup is formed an annular set of spaced-apart wedges 8 that have their inner surfaces designed as upward extensions of the inner surface of the body proper 1. The wedges 8 have their lower or base ends 8ᵃ located below the level of the nesting ring 6 and the wedges are spaced from the wall portion 5 by means of radial ribs 9 that also extend to a lower level than that of the nesting ring 6. The upper ends 10 of the ribs 9 are inclined upwardly-outwardly from the top ends of the wedges 8 which ends 10 serve to bite into the ice cream gob 11 and assist in holding the same in place.

I am aware that a somewhat similar idea is disclosed in the U. S. Patent No. 2,114,205 issued April 12, 1938, as applied to ice cream cones but in that case sharp edge teeth (shark tooth type) were employed to provide among other things seats for the nesting rings of nested cones, with the result that the nesting rings at times became broken, which was an obvious objectionable feature. By constructing the cup with wedges arranged in a circle and so designing the cup that the nesting ring of one cup in a nest of cups will rest solely on the mouth ring of the cup in which it is set, all the advantages of the patented cone are retained in my cup and the disadvantages of the same are eliminated.

In this application I make no claim per se to the crossed ribs or wings 3 and annular bead 4, which so far as my invention is concerned may or may not be used. However, I prefer to use them in my cup to relieve the nesting pressure on the nesting rings and avoid breaking the nesting ring if excessive nesting pressure is applied.

From the foregoing description, taken in connection with the accompanying drawings, it is thought that the construction, operation and advantages of the invention will readily appear to those skilled in the art.

What I claim is:

1. A pastry cup having a flat bottom and an upstanding body wall whose upper portion is offset outwardly from the lower portion of the body wall proper the upper portion of the body wall being substantially parallel to the lower portion of the body wall; an annular series of wedges in said enlarged upper portion positioned with their bases in proximity at the lower extremity of said enlarged upper portion and having their inner-side surfaces constituting a continuation of the inner-side face of the body wall proper and having their upper ends terminating short of the mouth of the cup; radial ribs connecting the wedges with the wall of said enlarged portion; and a nesting ring on the outside of said enlarged portion for seating on the mouth ring of a similar cup when cups are nested together.

2. A pastry cup having a flat bottom and an upstanding body wall whose upper portion is offset outwardly from the lower portion of the body wall proper the upper portion of the body wall being substantially parallel to the lower portion of the body wall; an annular series of wedges in said enlarged upper portion positioned with their bases in proximity at the lower extremity of said enlarged upper portion and having their innerside surfaces constituting a continuation of the inner-side face of the body wall proper and having their upper ends terminating short of the mouth of the cup; radial ribs connecting the wedges with the wall of said enlarged portion; and a nesting ring on the outside of said enlarged portion for seating on the mouth ring of similar cup when cups are nested together, said radial ribs and said wedges extending to a level below that of said nesting ring.

ALBERT A. HEYMAN.

REFERENCES CITED

The following references are of record in the file of this patent:

UNITED STATES PATENTS

| Number | Name | Date |
|---|---|---|
| 2,114,205 | Balton | Apr. 12, 1938 |